United States Patent [19]
Popp

[11] Patent Number: 6,122,808
[45] Date of Patent: Sep. 26, 2000

[54] OIL CONDUIT MECHANISM FOR SPINDLE HEAD OF FIVE AXIS MACHINE TOOL

[75] Inventor: Konrad Joseph Popp, Augsburg, Germany

[73] Assignee: Industrial Technology Research Institute, Hsin Chu Hsien, Taiwan

[21] Appl. No.: 09/501,985

[22] Filed: Feb. 11, 2000

[51] Int. Cl.[7] ................................ B23C 5/28; B23C 1/12
[52] U.S. Cl. ................................ 29/49; 29/48.5 R; 29/42; 409/201; 409/211; 409/216; 409/135; 409/136; 409/231; 184/6.14
[58] Field of Search ................................ 29/42, DIG. 56, 29/48.5, 48.5 R, 48.5 A, 49; 409/231, 136, 135, 201, 216, 211; 901/42; 84/6.14

[56] References Cited

U.S. PATENT DOCUMENTS

| | | | |
|---|---|---|---|
| 2,668,557 | 2/1954 | Hoelscher | 285/114 |
| 3,512,433 | 5/1970 | Juhasz et al. | 408/30 |
| 3,667,580 | 6/1972 | Schacher et al. | 188/291 X |
| 4,048,880 | 9/1977 | Link | 82/143 |
| 4,534,093 | 8/1985 | Jahnke et al. | 29/26 A |
| 4,706,351 | 11/1987 | Chuang | 29/39 |
| 5,238,712 | 8/1993 | Smith et al. | 427/239 |
| 5,391,026 | 2/1995 | Wu et al. | 409/231 X |
| 5,419,661 | 5/1995 | Meachum | 409/136 X |
| 5,538,375 | 6/1996 | Kwapisz | 409/201 |
| 5,549,177 | 8/1996 | Hosokawa et al. | 184/6.22 |
| 5,896,794 | 4/1999 | Trautmann | 82/129 |
| 6,036,413 | 3/2000 | Chandrasekar | 409/231 |
| 6,038,948 | 3/2000 | Link et al. | 82/147 |

FOREIGN PATENT DOCUMENTS

| | | | |
|---|---|---|---|
| 2410550 | 9/1975 | Germany. | |
| 6-134650 | 5/1994 | Japan | 409/135 |

*Primary Examiner*—William Briggs
*Assistant Examiner*—Erica Ergenbright
*Attorney, Agent, or Firm*—Rosenberg, Klein & Lee

[57] ABSTRACT

An oil conduit mechanism for spindle head of five-axis machine tool integrates cutting liquid conduit, lubricating oil conduit and braking oil conduit within the spindle head. Those conduits comprises ducts to guide cutting liquid, braking oil and lubricating oil to the processing location for cooling and lubrication. The oil conduit mechanism further comprises a lubricating oil recycling conduit to recycle the lubricating oil for repeated use.

3 Claims, 5 Drawing Sheets

OIL CONDUIT MECHANISM FOR SPINDLE HEAD OF FIVE AXIS MACHINE TOOL

FIELD OF THE INVENTION

The present invention relates to an oil conduit mechanism for a spindle head of a five-axis machine tool, particularly to an oil conduit mechanism integrating cutting liquid conduit, lubricating oil conduit and braking oil conduit within the spindle head.

BACKGROUND OF THE INVENTION

The liquid systems of the conventional general purpose machine tools such as cutting liquid conduit, lubricating liquid conduit, are arranged externally. Therefore, this kind of conduit arrangement is not suitable to the five-axis machine tool which can change processing angle. Moreover, the liquid systems of the conventional general-purpose machine tool is oil-based. The oil is liable to emulsification by the hot spindle caused by high-speed rotation. The lubrication and cooling effect is influenced.

It is an object of the present invention to provide a oil conduit mechanism for a spindle head of a five-axis machine tool wherein the oil conduit of the spindle head is arranged within the spindle to improve the conventional spindle head with externally arranged oil conduit.

It is another object of the present invention to provide a oil conduit mechanism for a spindle head of a five-axis machine tool wherein the oil conduit of the spindle head is arranged within the spindle to provide cooling during the processing of the spindle head.

It is another object of the present invention to provide a oil conduit mechanism for a spindle head of a five-axis machine tool comprising a lubricating oil recycling conduit to recycle the lubricating oil for repeated use.

The various objects and advantages of the present invention will be more readily understood from the following detailed description when read in conjunction with the appended drawing, in which:

DETAILED DESCRIPTION OF THE PREFERRED EMBODIMENT

Figure 1:
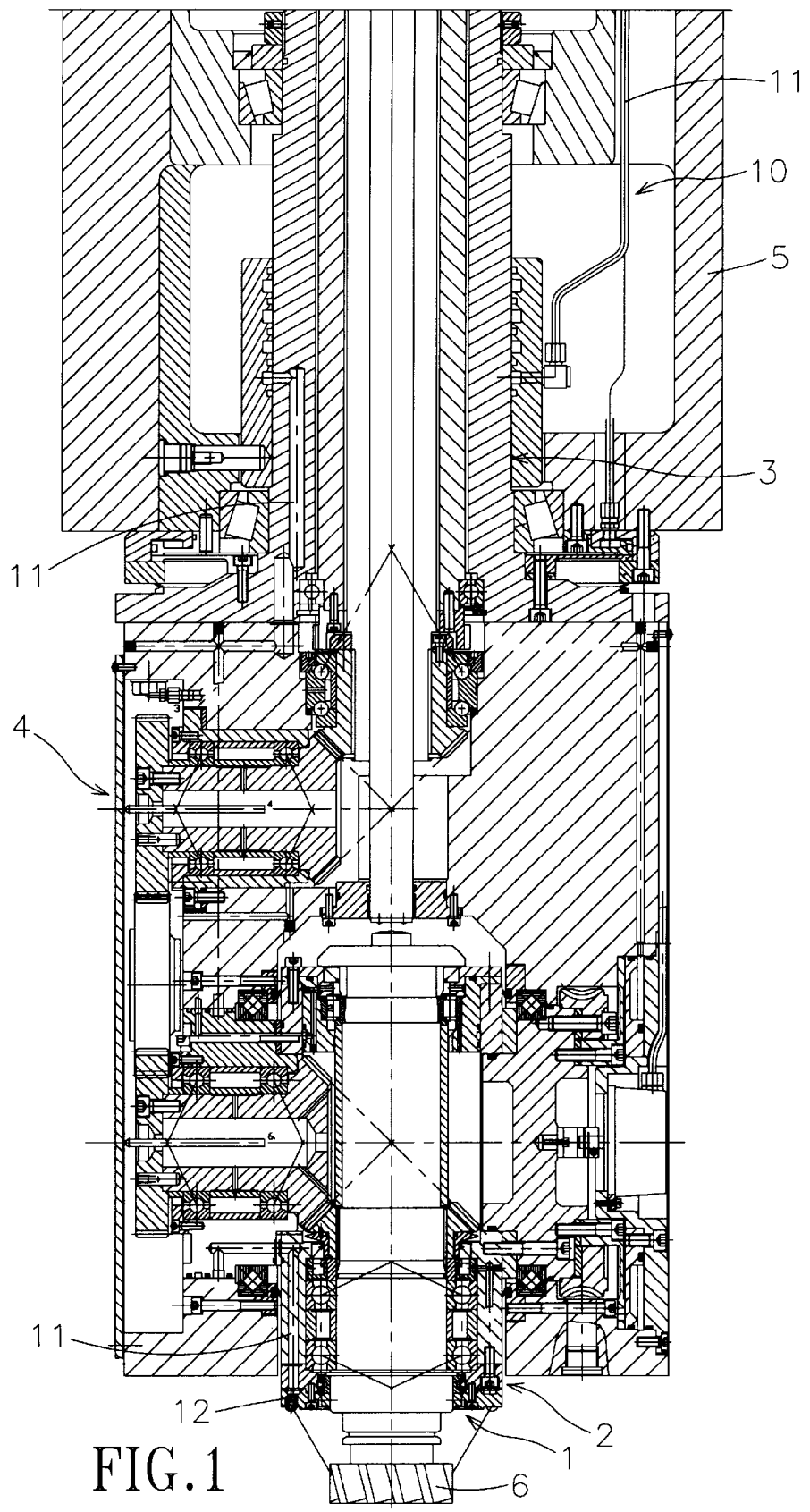
FIG. 1 is the planar view of the cutting liquid conduit of the present invention.

With reference to FIGS. 1, 2, 3A, 3B and 4, the present invention is intended to provide an oil conduit mechanism for spindle head of a five-axis machine tool. The spindle head of a five-axis machine tool comprises a spindle transmission means 1, a B-axis transmission means 2, a C-axis transmission means 3, a dividing head 4, and a spindle head 5. In the present invention, a spindle cutting liquid conduit 10, a braking oil conduit 20, a spindle lubricating oil conduit 30 and a braking oil recycling conduit 40 are arranged within the spindle. As shown in FIG. 1, the spindle cutting liquid conduit 10 comprises an oil duct 11 within the dividing head 4 and the spindle head 5. The oil duct 11 is used to lead in the cutting liquid and has a nozzle 12 for spraying cutting liquid. The nozzle 12 for spraying cutting liquid is placed beside the knife 6 below the spindle transmission means 1 and sprays cutting liquid when the spindle performs processing and has cooling function.

Figure 2:
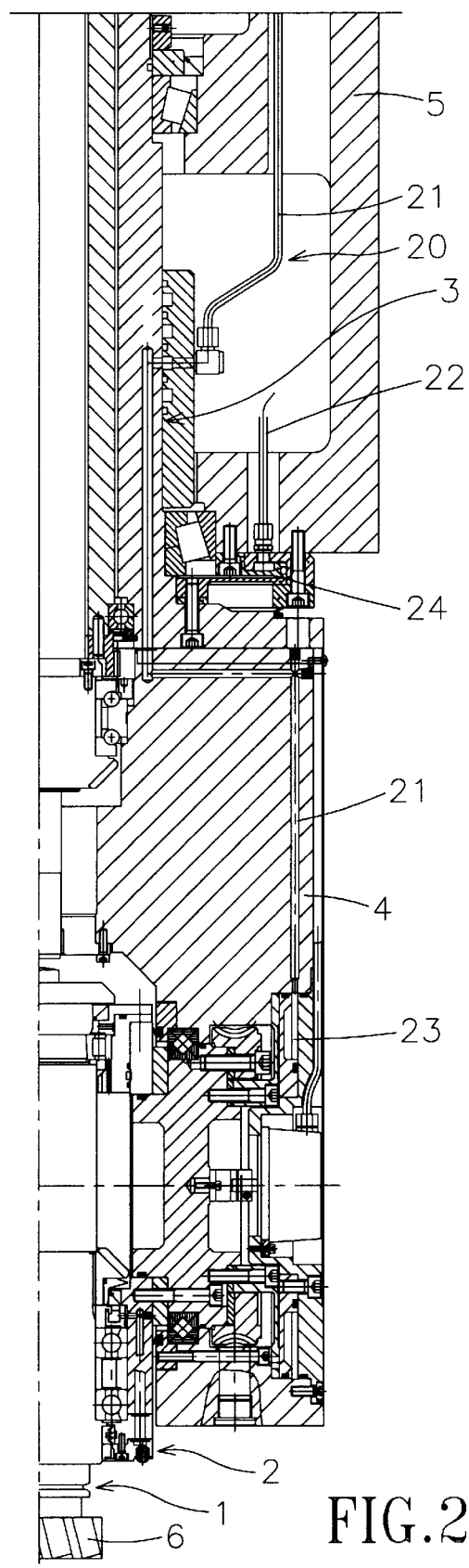
FIG. 2 is the planar view of the braking oil conduit of the present invention.

As shown in FIG. 2, the braking oil conduit 20 comprises a B-axis braking oil duct 21 within the dividing head 4 and the spindle head 5, and a C-axis braking oil duct 22 within the spindle head 5. The B-axis braking oil duct 21 and the C-axis braking oil duct 22 are functioned to lead in the braking oil. Moreover, The distal end of the B-axis braking oil duct 21 is connected to a B-axis braking system 23, the distal end of the C-axis braking oil duct 22 is connected to a C-axis braking system 24. Therefore, the B-axis transmission means 2 and the C-axis transmission means 3 can be braked at any time.

Figure 3A:
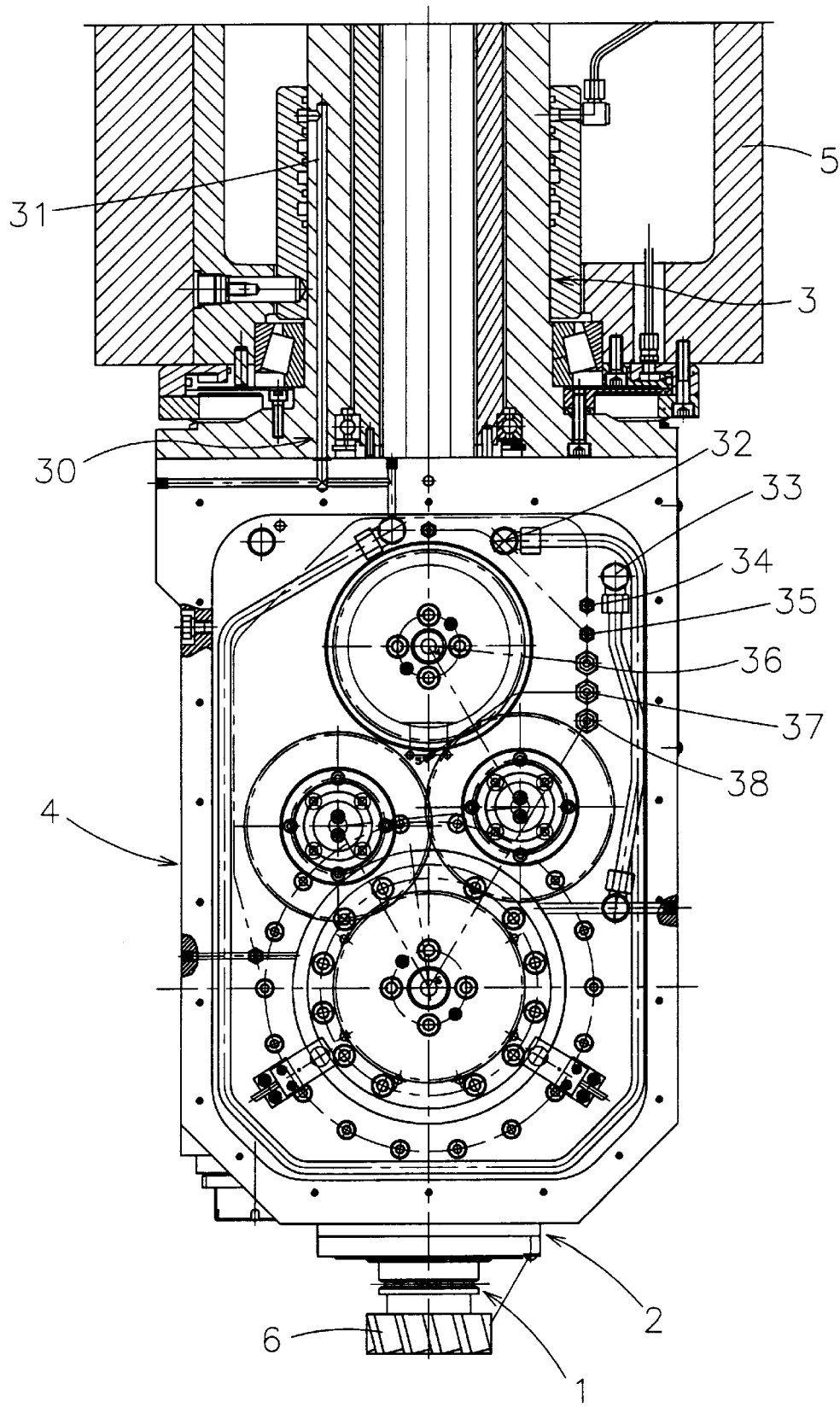
FIG. 3A is a planar view of the lubricating oil conduit of the present invention.
Figure 3B:
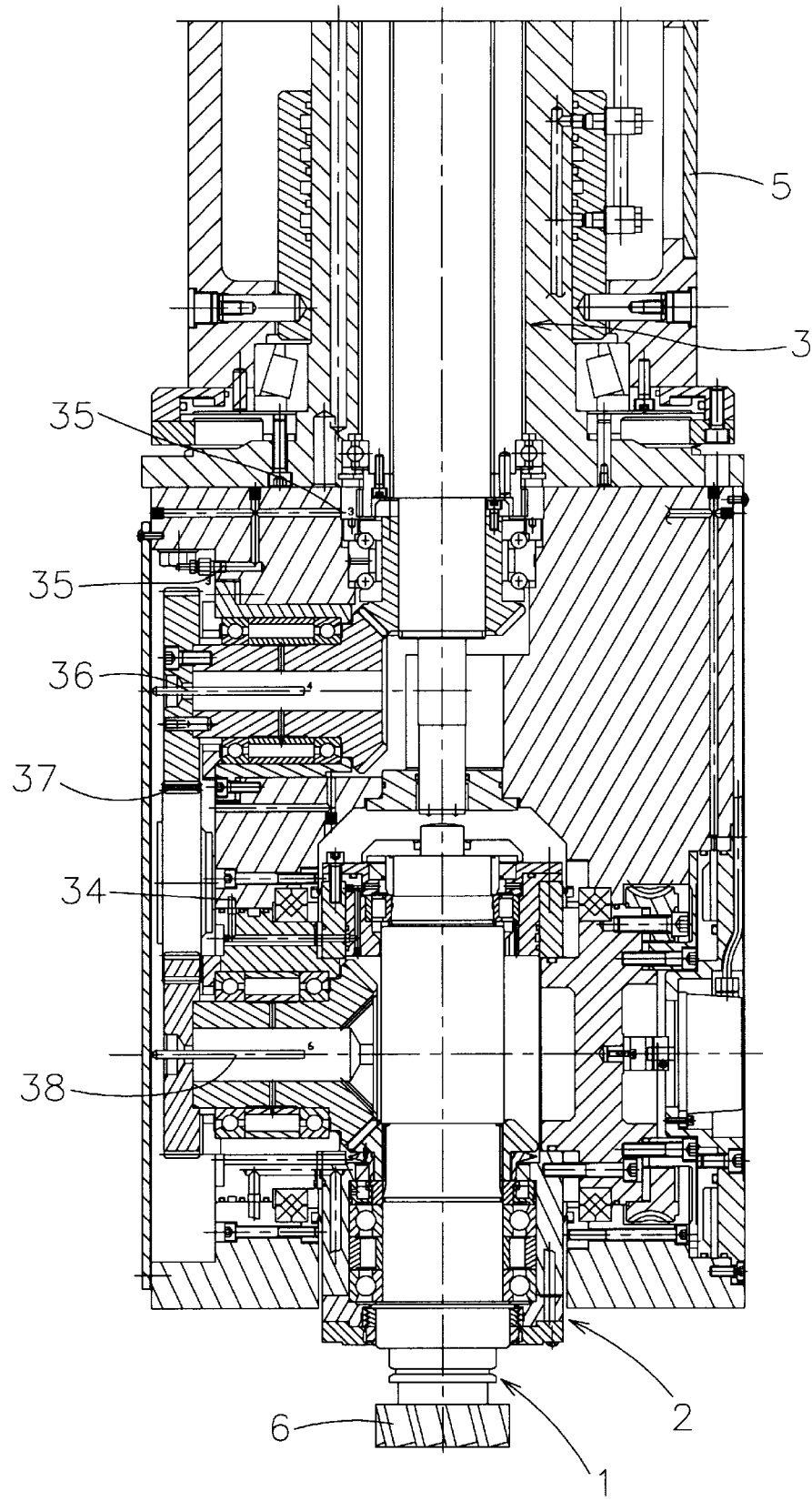
FIG. 3B is another planar view of the lubricating oil conduit of the present invention.

As shown in FIGS. 3A and 3B, the spindle lubricating oil conduit 30 comprises an oil duct 31 within the dividing head 4 and the spindle head 5 to lead in the lubricating oil. One end of the oil duct 31 is connected, through a dispenser 32, to a plurality of ducts 33, 34, 35, 36, 37 and 38. The plurality of ducts 33, 34, 35, 36, 37 and 38 are connected to gears and bearings within the spindle head 5. Therefore, the lubricating oil can be instilled to the gears and bearings within the spindle head 5 through the plurality of ducts 33, 34, 35, 36, 37 and 38.

Figure 4:
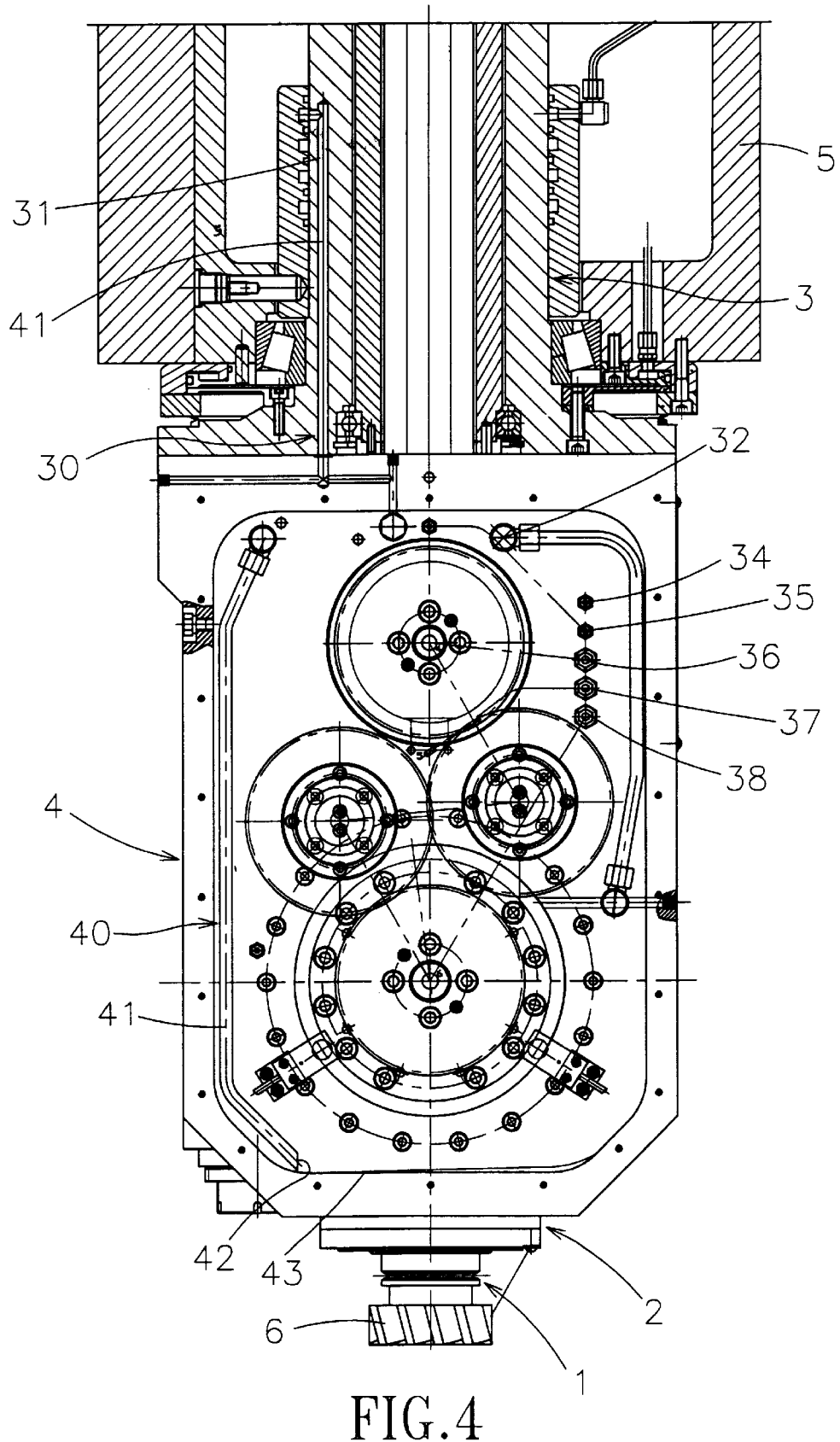
FIG. 4 is the planar view of the lubricating oil recycling conduit of the present invention.

As shown in FIG. 4, the lubricating oil recycling conduit 40 comprises an oil extraction duct 41 within the dividing head 4 and the spindle head 5. The oil extraction duct 41 is connected to an oil pump (not shown) and has an oil inlet 42 at the lower end thereof. The oil inlet 42 is located at the bottom of the spindle head 5 below the dividing head 4. The bottom side 43 of the dividing head 4 is designed to be an inclined surface and the oil inlet 42 is located at the lowest point of the bottom side 43. The oil extraction duct 41 can draw the lubricating oil at the bottom side 43 of the dividing head 4 through the action of the oil pump, thus recycling the lubricating oil.

To sum up, the oil conduit mechanism for spindle head of five-axis machine tool according to the present invention has following advantages:

1. The cutting liquid conduit, lubricating liquid conduit and braking oil conduit are arranged within the spindle head, the cooling efficiency and the utilization of space are improved.

2. In the present invention, an oil recycling conduit is also incorporated, the lubricating oil can be recycled for use. The cost is reduced and the cooling effect is enhanced.

3. In the present invention, all oil conduits are arranged within the spindle, the use of the oil conduits is not limited by rotation angle of the spindle.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. An oil conduit mechanism for spindle head of five-axis machine tool, comprising a spindle cutting liquid conduit comprising an oil duct within the spindle; a nozzle arranged at one end of the oil duct and spraying cutting liquid during the processing performed by the spindle;

a braking oil conduit comprising a B-axis braking oil duct within the spindle head, and a C-axis braking oil duct within the spindle head; one distal end of the B-axis braking oil duct connected to a B-axis braking system, one distal end of the C-axis braking oil duct connected to a C-axis braking system; whereby the B-axis transmission means and the C-axis transmission means of the spindle can be braked at any time;

a spindle lubricating oil conduit comprises an oil duct within the spindle head; one end of the oil duct connected to a plurality of ducts through a dispenser; the plurality of ducts connected to gears and bearings within the spindle head such that lubricating oil can be instilled to the gears and bearings through the plurality of ducts.

2. The oil conduit mechanism for spindle head of five-axis machine tool as in claim 1, further comprising a braking oil recycling conduit having an oil extraction duct within the spindle head, the oil extraction duct having an oil inlet at a bottom side of the spindle head through which the lubricating oil is extracted into the braking oil recycling conduit.

3. The oil conduit mechanism for spindle head of five-axis machine tool as in claim 2, wherein the bottom side of the spindle head is an inclined surface and the oil inlet is located at the lowest end of the bottom side.

\* \* \* \* \*